United States Patent
Dykstra et al.

(10) Patent No.: US 9,388,681 B2
(45) Date of Patent: Jul. 12, 2016

(54) METHOD TO OPTIMIZE DRILLING EFFICIENCY WHILE REDUCING STICK SLIP

(71) Applicant: Halliburton Energy Services, Inc., Houston, TX (US)

(72) Inventors: Jason Dykstra, Carrollton, TX (US); Zhijie Sun, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/431,071

(22) PCT Filed: Aug. 17, 2013

(86) PCT No.: PCT/US2013/055481

§ 371 (c)(1),
(2) Date: Mar. 25, 2015

(87) PCT Pub. No.: WO2015/026311

PCT Pub. Date: Feb. 26, 2015

(65) Prior Publication Data

US 2015/0240615 A1 Aug. 27, 2015

(51) Int. Cl.
*G06F 19/00* (2011.01)
*E21B 44/00* (2006.01)
*G05D 17/02* (2006.01)

(52) U.S. Cl.
CPC .............. *E21B 44/005* (2013.01); *E21B 44/00* (2013.01); *G05D 17/02* (2013.01)

(58) Field of Classification Search
CPC ........ E21B 44/00; E21B 44/005; G05D 17/02
See application file for complete search history.

(56) References Cited

U.S. PATENT DOCUMENTS

| | | | |
|---|---|---|---|
| 8,689,906 B2 * | 4/2014 | Nessjoen | E21B 44/00 175/25 |
| 8,950,512 B2 * | 2/2015 | Nessjoen | E21B 44/00 175/24 |
| 2005/0178558 A1 | 8/2005 | Kolle et al. | |
| 2011/0153217 A1 | 6/2011 | Rodney | |
| 2011/0232966 A1 * | 9/2011 | Kyllingstad | E21B 44/00 175/24 |
| 2011/0245980 A1 * | 10/2011 | Nessjoen | E21B 44/00 700/280 |
| 2012/0130693 A1 | 5/2012 | Ertas | |
| 2012/0228028 A1 | 9/2012 | Turner et al. | |
| 2013/0032402 A1 | 2/2013 | Byreddy et al. | |

(Continued)

OTHER PUBLICATIONS

Saldivar, Martha Belem, et al. "Stick-slip oscillations in oilwell drilstrings: distributed parameter and neutral type retarded model approaches." IFAC 18th world congress. 2011.*

(Continued)

*Primary Examiner* — Michael D Masinick
(74) *Attorney, Agent, or Firm* — Alan Bryson; Baker Botts L.L.P.

(57) ABSTRACT

Reducing or eliminating stick-slip and vibrations downhole may include controlling top drive torque in order to adjust drill bit angular speed in a manner that prevents, eliminates, or reduces stick-slip and vibration. Control methods and systems may include solving one or more optimization problems including an objective function. The objective function may be subject to conditions including a physical model of the drilling system. The objective function may be minimized without reference to a model, but instead by reference to estimated stick-slip frequency based upon a drill bit angular speed profile. In addition, actual downhole measurements for use in control methods and systems, such as drill bit angular speed, may be estimated using an observer.

26 Claims, 6 Drawing Sheets

(56) References Cited

U.S. PATENT DOCUMENTS

| | | | |
|---|---|---|---|
| 2013/0066445 A1 | 3/2013 | Wang | |
| 2014/0034386 A1* | 2/2014 | Nessjoen | E21B 44/00 175/24 |
| 2014/0360779 A1* | 12/2014 | Kyllingstad | E21B 44/00 175/24 |
| 2015/0107897 A1* | 4/2015 | Nessjoen | E21B 44/00 175/24 |

OTHER PUBLICATIONS

Navarro-López, Eva María, and Rodolfo Suárez. "Practical approach to modelling and controlling stick-slip oscillations in oilwell drillstrings." Control Applications, 2004. Proceedings of the 2004 IEEE International Conference on. vol. 2. IEEE, 2004.*

Aslaksen, H., et al. "Integrated FEA modeling offers system approach to drillstring optimization." IADC/SPE Drilling Conference. Society of Petroleum Engineers, 2006.*

Rudat, Jens, and Dmitriy Dashevskiy. "Development of an innovative model-based stick/slip control system." SPE/IADC Drilling Conference and Exhibition. Society of Petroleum Engineers, 2011.*

International Search Report and Written Opinion issued in related PCT Application No. PCT/US2012/055481 mailed May 19, 2014, 10 pages.

* cited by examiner

METHOD TO OPTIMIZE DRILLING EFFICIENCY WHILE REDUCING STICK SLIP

CROSS-REFERENCE TO RELATED APPLICATION

The present application is a U.S. National Stage Application of International Application No. PCT/US2013/055481 filed Aug. 17, 2013, which is incorporated herein by reference in its entirety for all purposes.

BACKGROUND

The present disclosure relates generally to subterranean drilling operations and, more particularly, to stabilizing drill bit, drill string, and/or downhole tools from lateral vibration and stick-slip.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Subterranean drilling apparatuses such as drill bits, drill strings, bottom-hole assemblies (BHAs), and/or downhole tools may contact the borehole wall in such a way that they become caught or lodged in the borehole wall, causing the drill string to "stick." When the drilling apparatus "sticks," the rotational movement of the drill string is either stopped or severely decreased. Torque is still imparted to the drill string at the surface, despite the drilling apparatus being stuck, causing the drill string to twist. Once the torque applied to the drill string overcomes the force of static friction on the drilling apparatus, the drill string "slips" or releases from the borehole wall. This phenomenon is problematic for several reasons, including possible decrease in the lifespan of downhole components, decrease in the quality of the borehole, and delays in drilling.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present disclosure relates generally to subterranean drilling operations and, more particularly, to stabilizing drill bit, drill string, and/or downhole tools from lateral vibration and stick-slip.

The present disclosure in some embodiments provides methods and systems for controlling the angular speed of a drill bit coupled to a top drive via a drill string by adjusting torque imparted by the top drive on the drill string.

Modern petroleum drilling and production operations demand information relating to parameters and conditions downhole. Several methods exist for downhole information collection, including logging while drilling ("LWD") and measurement-while drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 1:
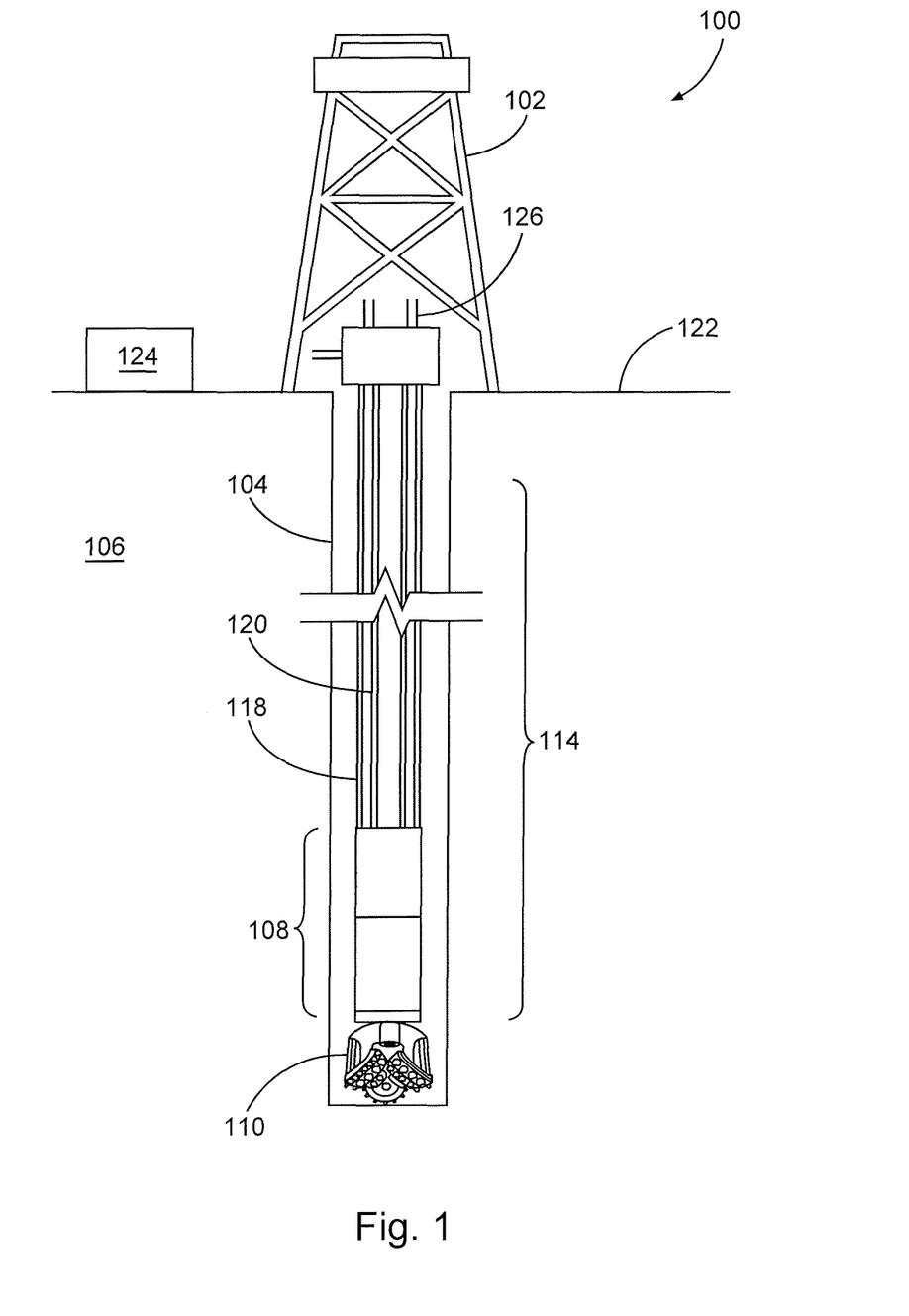
FIG. 1 depicts an example drilling system, according to aspects of the present disclosure.

FIG. 1 illustrates an example drilling system, according to aspects of the present disclosure. The drilling system 100 includes a rig 102 mounted at the surface 122, positioned above a borehole 104 within a subterranean formation 106. Although the surface 122 is shown as land in FIG. 1, the drilling rig of some embodiments may be located at sea, in which case the surface 122 would comprise a drilling platform. The rig 102 may include a top drive 126 coupled to a drill string 114, which may, as shown in FIG. 1, include multiple drilling pipes (e.g., inner pipe 120 and outer pipe 118). A control unit 124 at the surface 122 may control the operation of at least some of the drilling equipment, including the top drive 126. The control unit 124 may include a control system (which in turn may be or may include an information handling system), which may be communicatively coupled to at least some of the drilling equipment, including the top drive 126.

The drill string may in some embodiments further comprise a bottom hole assembly (BHA) 108, which may include tools such as LWD/MWD elements coupled to the outer and inner pipes. The LWD/MWD elements may comprise downhole instruments. While drilling is in progress these instruments may continuously or intermittently monitor predetermined drilling parameters and formation data and transmit the information to a surface detector by some form of telemetry. Alternatively, the data can be stored while the instruments are downhole, and recovered at the surface later when the drill string is retrieved. The drill string 114 is coupled to the drill bit 110, such that the drill bit 110 is coupled to the top drive 126 via the drill string 114. Accordingly, the top drive 126 may apply torque to the drill string 114, which in turn applies torque to the drill bit 110, causing it to rotate with a drill bit angular speed $\dot{\theta}$.

At some point or points of time during the drilling process, all or part of the drilling assembly (including drill bit 110 and drill string 114) may "stick" during contact with the borehole 104, whereupon rotational movement of the drill string 114 and/or bit 110 is either stopped or severely decreased. Torque may still be imparted to the drill string 114 from the top drive 126, despite the drill string 114 (or some portion thereof) and/or bit 110 being stuck, causing the drill string 114 above the stuck portion to twist. Once the torque overcomes the force of friction on the stuck component, the drill string 114 and/or bit 110 may "slip" or release from the borehole wall 104. This "slip" and "stick" action may decrease the lifespan of downhole components, including the drill bit 110, LWD/MWD measurement elements within the BHA 108, and decrease the quality of the borehole 104.

The control methods according to some embodiments will be described in greater detail below with respect to the following figures. Such methods may be implemented in various embodiments by a control system, such as a control system included within control unit 124 of FIG. 1. A control system may include a controller communicatively coupled to an actuator coupled to a top drive (i.e., a device suitable for effecting physical alterations to the torque output of the top drive based upon control signals sent by the controller). Furthermore, a controller according to some embodiments may be or may include an information handling system. Thus, for example, a controller may include at least one processing resource, an interface unit capable of transmitting a control signal to the top drive actuator, and a computer-readable medium comprising executable instructions suitable for carrying out any one or more control methods according to the present disclosure. In other embodiments, the control system may include means for outputting control signal guidance (e.g., a monitor or other display mechanism, and/or an aural signaling mechanism, or any other device suitable for outputting control signal guidance) such that an operator may implement such control signal guidance via manual input to a control mechanism for controlling the top drive.

Figure 2:
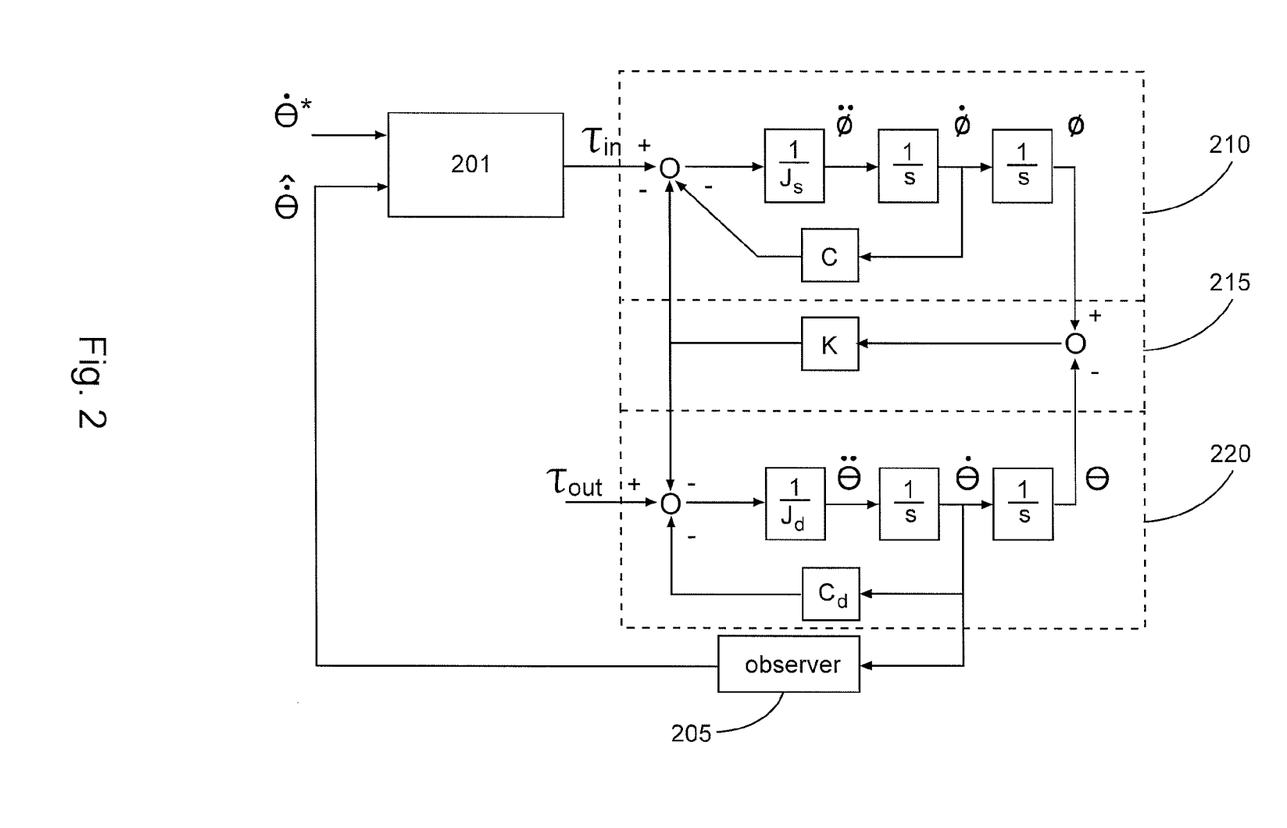
FIG. 2 is a diagram illustrating an example top drive torque control system, according to aspects of the present disclosure.

FIG. 2 is a process control block diagram illustrating an example control method according to some embodiments. The example illustrated in FIG. 2 is a closed-loop control method utilizing an optimization control element 201. The optimization control element may output a control signal $\tau_{in}$, and control of the top drive may be based at least in part upon the control signal $\tau_{in}$. That is, for example, the top drive may be controlled by control signal $\tau_{in}$ so as to obtain a desired bit angular speed (e.g., by setting the top drive to apply a particular torque to the top of the drill string). Thus, the control signal $\tau_{in}$ may in some embodiments include a torque for the top drive to achieve. In some embodiments, it may include a torque to be exerted upon the top drive by an actuator or like device in order to achieve a desired torque applied by the top drive to the drill string). The control process may be iterative (e.g., a first control signal $\tau_{in}$ may control the top drive so as to obtain a first bit angular speed, then a second control signal $\tau_{in}$ may control the top drive so as to obtain a second bit angular speed, and so on if necessary and/or desired).

The control method may further include modeling the physical dynamics according to the transfer functions shown in the block diagram of FIG. 2, which in combination according to the relationships illustrated by the block diagram, may constitute a combined transfer function $g_1(\tau_{in})$. In the example of FIG. 2, the combined transfer function includes the transfer functions illustrated in FIG. 2 relating: (i) input torque applied by the top drive to the drill string (as determined at least in part by control signal $\tau_{in}$); (ii) the frictional torque on the bit, $\tau_{out}$ (which may be measured directly or estimated based on the modeled dynamics of FIG. 2); angular speed of the top drive $\dot{\phi}$ (which also includes, as shown in FIG. 2, rate of change of top drive angular speed $\ddot{\phi}$ and top drive angle $\phi$); and drill bit angular speed $\dot{\theta}$ (which also includes, as shown in FIG. 2, rate of change of drill bit angular speed $\ddot{\theta}$ and drill bit angle $\theta$). FIG. 2 further illustrates the portions of the transfer functions within the block diagram relating to dynamics of the top drive 210, the drill string 215, and the bit 220. In some embodiments, the physical dynamics may be modeled according to any method selected to describe the physical drilling system. For example, the drilling process may be modeled as a mass-spring-damper system, as shown by the transfer functions arranged according to the block diagram of FIG. 2.

In addition, in some embodiments, the control method may include an observer 205, as shown in FIG. 2. The observer may estimate the drill bit angular speed $\dot{\theta}$ based upon any number of measurements in the system which may be related to drill bit angular speed according to the modeled dynamics (e.g., as shown in FIG. 2). For example, it may estimate drill bit angular speed based at least in part upon the torque applied by the top drive to the drill string ($\tau_{in}$). In some embodiments, it may estimate the drill bit angular speed based at least in part upon reactive torque exerted on the top drive in response to the top drive applying torque $\tau_{in}$ to the drill string. In certain embodiments, the observer may estimate drill bit angular speed based at least in part upon various downhole measurements such as, for example, previous samples of drill bit angular speed. Furthermore, a measurement of previous top drive input torque associated with a previous measured drill bit angular speed samples (e.g., the torque applied by the top drive to the drill string so as to have produced the previous measured drill bit angular speed) may be used by the observer. The observer may in some embodiments use other measurements in addition to or instead of the aforementioned, such as: weight-on-bit, torque-on-bit, and/or rotational speed at any one or more points along the drill string (e.g., as measured by a sensor at any one or more points along the drill string). These measurements may in some embodiments be used in conjunction with the model to determine various parameters for use in the model (e.g., friction coefficient, which may be inferred based at least in part upon weight-on-bit and torque-on-bit measurements).

In other embodiments, the drill bit angular speed $\dot{\theta}$ may be measured directly, or it may be modeled based upon control inputs. The modeled, measured, or estimated drill bit angular speed is transmitted to the optimization control element 201 (e.g., as a drill bit angular speed signal), which in turn generates the control signal $\tau_{in}$ based at least in part upon the drill bit angular speed, a drill bit angular speed set point $\dot{\theta}^*$, and an objective function (which may in some embodiments be part of an optimization problem).

Figure 3:
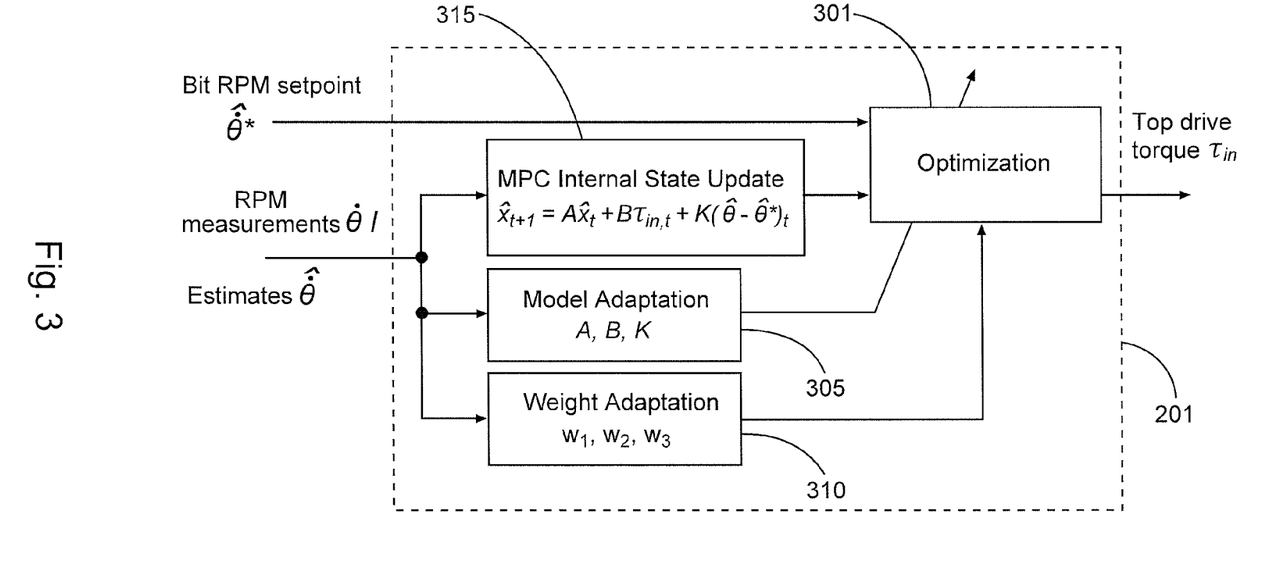
FIG. 3 is a diagram illustrating an example model predictive controller, according to aspects of the present disclosure.

For example, FIG. 3 illustrates an embodiment of the optimization control element 201 including an optimization problem 301. In embodiments according to that shown in FIG. 3, the control process may use model predictive control (MPC); that is, control signal generation may be based at least in part upon a model predictive control algorithm. In particular, such an algorithm may include a physical model of the dynamics of the system being controlled. In particular, in some embodiments, MPC control may use one or more models to balance drilling efficiency and stick-slip elimination dynamically according to one or more operating conditions. The optimization problem 301 may maintain a model characterizing the input-output relationship of the drilling process, e.g., a model of dynamics between input torque to the top drive and resulting bit angular speed (such as $g_1(\tau_{in})$, derived from the transfer functions modeling the system of FIG. 2, as discussed previously). The optimization problem 301 may also include an objective function for which an optimal solution should be found, subject to one or more constraints. An optimal solution may, for example, be a minimum or maximum value of the objective function (subject to the one or more constraints). In some embodiments, the one or more constraints may include the model of dynamics between input torque to the top drive and resulting bit angular speed. An objective function of some embodiments may include one or more terms. Any one or more terms of the objective function may describe a physical aspect of the system comprising the top drive and drill bit. In some embodiments, each term may describe one or more physical dynamics of any one or more of the top drive, drill bit, and drill string. In some embodiments, the objective function may also include one or more penalty terms meant to penalize violation of one or more constraints to which the objective function is subject. For example, the objective function may comprise a drill string rotation penalty term for penalizing rotation of part of the drill string at angular speed faster than maximum angular speed, thereby providing for either slower angular rotation or slower increase of angular rotation in the solution to the objective function. Constraints are discussed in greater detail below. Furthermore, in certain embodiments, any one or more terms may be associated with a multiplicative weighting factor.

For example, an objective function of some embodiments may take the following form:

$$\min J = \sum_{j=t}^{j=t+N} W_1 \cdot (\dot{\theta} - \dot{\theta}^*)^2 + W_2 \cdot (\Delta \tau_{in,j})^2 + W_3 \cdot MSE \quad \text{(Eq. 1)}$$

The objective function of Eq. 1 is a cost function comprising 3 terms: a stick-slip reducing term, in this example $(\dot{\theta} - \dot{\theta}^*)^2$ (which in the example objective function of Eq. 1 is the tracking error of bit angular speed compared to bit angular speed set-point), associated with first weighting factor $W_1$; a torque input smoothing term, in this example $(\Delta \tau_{in,j})^2$ (describing changes in torque applied by the top drive to the drill string such that smaller change may equate to smoother operation), associated with second weighting factor $W_2$; and a drilling efficiency term, here mechanical specific energy MSE, associated with third weighting factor $W_3$. In some embodiments, the MSE may be the amount of energy required per unit volume of the formation rock drilled by the drill bit. Minimizing the MSE may therefore lead to the highest efficiency (in terms of energy used per amount drilled).

In some embodiments, the objective function may be solved to find a top drive torque that minimizes the value of the function (e.g., the value of resulting in min J), thereby indicating the optimal torque input signal $\tau_{in}$ to be generated. Thus, in the example shown, minimizing J may entail minimizing each of bit angular speed tracking error, incremental changes in torque (thereby resulting in smoother operation), and MSE (thereby minimizing energy needed to drill a given volume into the formation). Furthermore, the objective function (and hence its solution) may be subject to one or more constraints, including the model of dynamics between input torque to the top drive and drill bit angular speed. Constraints of some embodiments may include, for example:

$$(\dot{\theta}-\dot{\theta}^*)=g_1(\tau_{in}) \quad \text{(Eq. 2)}$$

$$\text{MSE}=g_2(\tau_{in},\dot{\theta}) \quad \text{(Eq. 3)}$$

$$0 \leq \dot{\theta} \leq \dot{\theta}_{max} \quad \text{(Eq. 4)}$$

$$0 \leq \tau_{in} \leq \tau_{in,max} \quad \text{(Eq. 5)}$$

That is, the tracking error of bit angular speed compared to the bit angular speed set-point may be subject to the constraint of bit angular speed predicted by the model of dynamics between input torque of the top drive and resulting bit angular speed (Eq. 2). The mechanical specific energy MSE, which is an index of efficiency, may be an empirical function $g_2(\tau_{in}, \dot{\theta})$ describing drilling efficiency (Eq. 3) (which may be derived based upon data and/or mathematical descriptions of physical dynamics of energy per unit volume drilled). The drill bit angular speed and torque input to the top drive may be constrained by mechanical limitations (such as, e.g., maximum angular speed, weight on bit, or other parameter for safe and/or non-damaging operation and the like) on each of those components in the system (Eqs. 4 and 5).

The optimization control element 201 may in some embodiments also include model adaptation 305 for updating the model (e.g., model $g_1(\tau_{in})$) based at least in part upon operating data associated with any one or more of the top drive, drill bit, and drill string so as to obtain an updated model. This may be desired in some instances in which the model includes terms not readily known, measured, or calculated (such as K, C, and $C_d$, of FIG. 1 used in the model $g_1(\tau_{in})$), such that the model may be updated to adapt to the operating data. Operating data may include reactive torque exerted on the top drive in response to the top drive applying torque to the drill string; prior samples of drill bit angular speed (which may be actually measured, and/or estimated by, for example, an observer 205); weight-on-bit, torque-on-bit; rotational speed measured at any one or more points along the drill string (e.g., by sensors at such location(s) along the drill string). Of use in some embodiments may be a previously measured and/or estimated torque input by the top drive associated with a resultant drill bit angular speed (which also may be previously measured and/or estimated).

The optimization control element 201 may furthermore include a weight adaptation element 310 for updating the one or more weighting factors based at least in part upon one or more operating conditions associated with the drill bit so as to include updated weighting factors in the objective function. Operating conditions upon which weighting factor updates are based may include any one or more operating conditions discussed above with respect to model updates. In some embodiments the model and weighting factor updates may be based upon substantially the same operating conditions (whether measured and/or estimated). Although, in some of these embodiments, model updates may lead to better estimation of the current state of the drilling system, while weighting factor updates may lead to better operation (e.g., operation aimed at reducing stick slip, minimizing energy use per unit volume drilled, etc.).

As noted, in certain embodiments, weighting factors may be updated so as to emphasize or deemphasize, as desired, a term associated with a particular weighting factor. For example, where operating conditions indicate severe stick-slip is or will be occurring, a weighting factor associated with a stick-slip reducing term may be increased accordingly in order to emphasize that aspect of the objective function (thereby emphasizing stick-slip reduction in the control signal $\tau_{in}$). Concurrently, less weight may be attached to a drilling efficiency term in order to further shift emphasis from drilling efficiency (e.g., maximum drill bit angular speed) and toward minimizing stick slip (e.g., by reducing drill bit angular speed).

Figure 4:
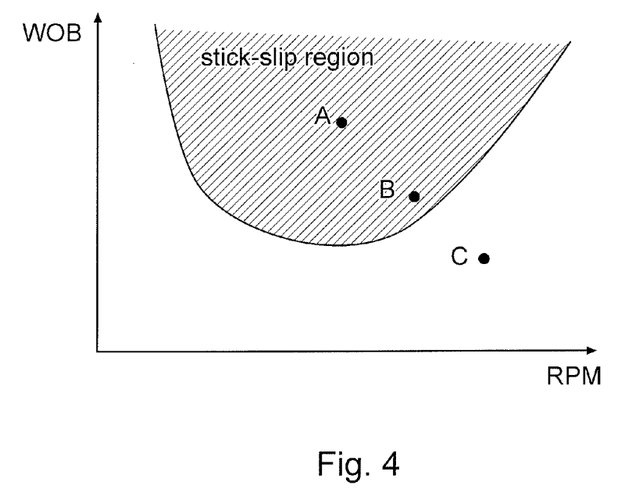
FIG. 4 is a chart illustrating weight adaptation and operating conditions according to aspects of the present disclosure.

In some embodiments, the weight adaptation element 310 may include, reference, or otherwise rely at least in part upon a function and/or model relating stick-slip to one or more operating conditions. For example, FIG. 4 illustrates a model including a chart of weight-on-bit WOB versus RPM (bit rotations per minute, which may be used as an alternative expression of bit angular speed $\dot{\theta}$. FIG. 4 also includes a function modeling when the operating conditions of WOB and RPM may result in stick-slip (such function may, for example, be stored in the weight adaptation element 310 of some embodiments), and further includes illustrative points A, B, and C, indicating example operating conditions at which various weighting updates may be effected by weight adaptation element 310. For instance, at operating conditions for WOB and RPM corresponding to point A, the model of FIG. 4 indicates that there exists severe stick-slip, and a weighting factor associated with a stick-slip reduction term may be increased accordingly so as to emphasize stick-slip reduction, while a weighting factor associated with drilling efficiency may be reduced so as to deemphasize drilling efficiency. In terms of the example objective function of Eq. 1, weighting factor $W_1$ associated with stick-slip reduction term $(\dot{\theta}-\dot{\theta}^*)$ would be increased by the weight adaptation element 310 when operating conditions are at point A on FIG. 4, while weighting factor $W_3$ associated with drilling energy efficiency term MSE would be decreased. Continuing with reference to Eq. 1 for illustrative purposes, if instead the current drilling conditions align with point B on the chart of FIG. 4, the operating condition model indicates only minor stick-slip, if any, such that the values of $W_1$ and $W_3$ may be chosen such that control efforts on reducing stick-slip and on increasing drilling energy efficiency are about the same. And if instead the current drilling conditions align with point C, outside the stick-slip region, then $W_1$ can be set as a very small number to prevent the process going back to the stick-slip region, while putting control emphasis primarily upon drilling energy efficiency.

Furthermore, the change rates of the weighting factor or factors may be restricted in order to ensure stability of the drilling system, for example by placing limits on the rate of change. In some embodiments, the change rates of the weighting factor(s) may be restricted to satisfy a Lyapunov function used to constrain total energy of the drilling system. This may help prevent violent changes in weights, which could result in undesirable large oscillations in top drive torque control signal and bit angular speed $\dot{\theta}$. A Lyapunov function of some embodiments may be a function characterizing the stability of the drilling system. Such a function need not have a general form, but instead may be designed specifically for each system. Nonetheless, in some instances, a Lyapunov function may take a quadratic form consisting of, e.g., total potential and kinetic energy of the system. In embodiments where Lyapunov functions are used to constrain the total energy of the drilling system, then, new weighting factors may be required to satisfy the condition that the associated Lyapunov function does not increase over time. In this way, then, such embodiments may ensure that total potential and kinetic energy of the system do not increase over time.

In addition, the optimization control element 201 may also include an MPC Internal State Update element 315, which may be used to better estimate the current state of the drilling system and/or to predict future behavior of the system. When a measurement is available, it is applied to the model for state update. Then, the control signal may be generated based at least in part upon the internal state(s). The MPC Internal State Update element 315 may therefore aid in iterative function of the control loop (e.g., output of control signal leads to one or more system outputs, such as bit angular speed (i.e., RPM), which output(s) in turn are measured and/or estimated, with the measurement(s) and/or estimate(s) then being fed back to the model for generation of a control signal associated with the now-updated model state.

It will be apparent to one of ordinary skill in the art in view of the above disclosure that operation of the control process may in some embodiments be iterative. That is, a first control signal $\tau_{in}$ may be generated based at least in part a bit angular speed set-point, a first bit angular speed, and an optimization problem comprising (i) an objective function at a first state and (ii) one or more first state constraints to which the optimization problem is subject, such constraints including a model of dynamics between the torque of the top drive and resulting bit angular speed; the top drive may be controlled based at least in part upon the first control signal; operating conditions associated with the drill bit, and/or operating data associated with any one or more of the top drive, drill bit, and drill string, may be monitored, measured, estimated, modeled, or otherwise obtained; and any one or more of the model and the objective function may be updated based upon either or both of the operating conditions and operating data—that is, the model (such as $g_1(\tau_{in})$) may be updated, and/or the weighting factors of the objective function $W_1$, $W_2$, etc. may be updated. Then, a second control signal may be generated based at least in part upon the bit angular speed set-point, the second bit angular speed (e.g., the bit angular speed resulting from the top drive torque obtained due to the first control signal), and the optimization problem comprising (i) the objective function at a second state (e.g., with updated weighting factors $W_1$, etc.) and (ii) one or more second state constraints (including the updated model). Of course, it maybe possible that either or both of the model and the weighting factors do not change from their first states during updating, such that the objective function at the second state and/or the second state constraints are not different (or are not significantly different) from those at the first state. Furthermore, the process may be repeated as necessary or as desired during the drilling process.

Figure 5:
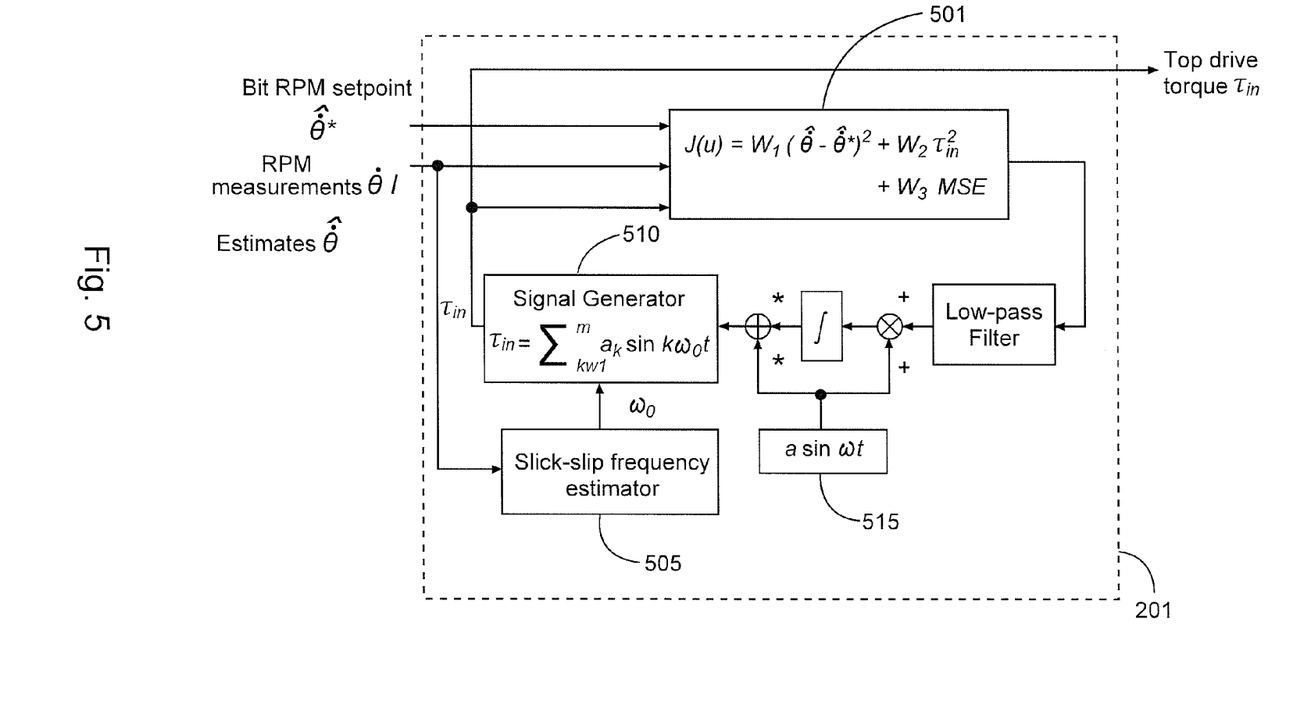
FIG. 5 is a diagram illustrating an example extremum-seeking controller according to aspects of the present disclosure.
Figure 6:
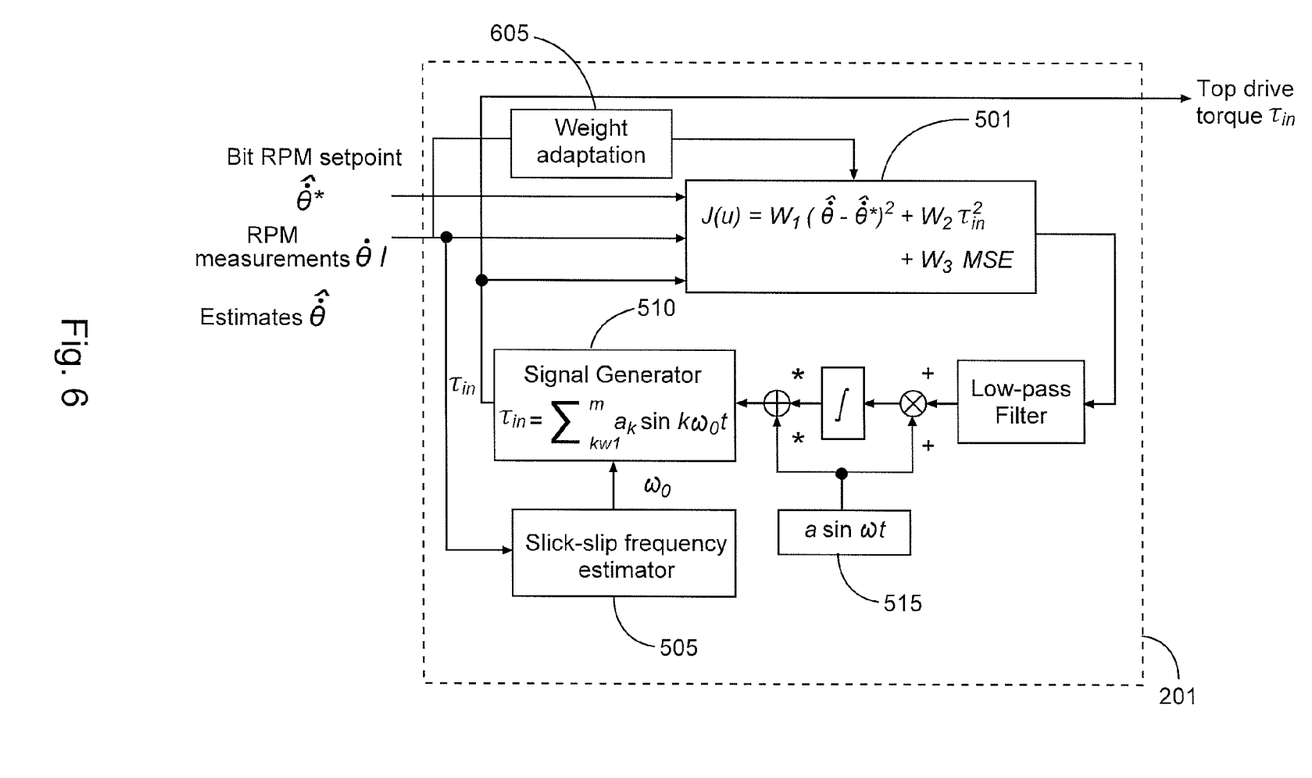
FIG. 6 is a diagram illustrating an example extremum-seeking controller according to aspects of the present disclosure.

FIG. 5 illustrates another example optimization control element 201 according to other embodiments, which does not include a model in the solution to an optimization problem. Embodiments according to this example instead may utilize a form of extremum seeking control (ESC), that is, control signal generation may be based at least in part upon an extremum seeking control algorithm. Such embodiments may include mitigating, reducing, and/or eliminating stick-slip without models by controlling how a series of sinusoidal waves is combined. This may in some embodiments include an objective function 501 (similar to an objective function that may be used in various embodiments of the optimization control element 201 according to FIG. 3, such as Eq. 1, and therefore including one or more terms and/or penalty terms as described above with respect to Eq. 1). The objective function 501 may have one or more gradient directions, such that the function may be minimized along any one or more of those gradient directions. In addition, each term of the objective function 501 may include a weighting factor. As with the weighting factors of objective functions for use in the model-predictive control embodiments discussed above, weighting factors of some ESC embodiments may be updated based at least in part upon any one or more operating conditions. Thus, ESC according to some embodiments may include a weight adaptation element 605, similar to the weight adaptation element 310 of FIG. 3, as shown in FIG. 6. Weight adaptation element 605 uses as input measured and/or estimated operating conditions (shown in FIG. 6 as bit angular speed/RPM measurements). Thus, for example, although not shown in FIG. 5 or 6, the weight adaptation element 605 could additionally use the $\tau_{in}$ signal (and/or measured top drive torque actually applied to the drill string). And in some embodiments, the weight adaptation module could use any other input measurements and/or estimates of operating conditions such as those previously discussed herein.

The optimization control element 201 according to embodiments of either FIG. 5 or 6 may further include a stick-slip frequency estimator 505, and a control signal $\tau_{in}$ generated according to such embodiments may therefore be based at least in part upon the estimated stick-slip frequency and the objective function, such that the control of the top drive according to the signal decreases the value of the objective function along any one or more of the one or more gradient directions.

The stick-slip frequency estimator 505 estimates stick-slip frequency such that the control signal $\tau_{in}$ may counteract stick-slip according to the estimated frequency. In particular, since the angular speed of the drill bit may be periodic when stick-slip occurs, stick-slip frequency may be estimated from a profile of angular speed of the drill bit over a time period. More specifically, in some embodiments, a Fourier transform may be performed upon the profile of drill bit angular speed over time (that is, the Fourier series may be used to approximate the angular speed of the drill bit), which decomposes the stick-slip signal into a series of sinusoidal waves. The frequencies of the waves may be in integral multiple of the stick-slip frequency, such that the stick-slip frequency estimator 505 may perform frequency domain analysis (e.g., power spectrum analysis) on a Fourier transformed signal of drill bit angular speed over time so as to estimate the main stick-slip frequency $\omega_0$. The control signal generated by signal generator 510 according to some embodiments may be, for example:

$$\tau_{in} = \sum_{k=1}^{k=m} a_k \sin k\omega_0 t \qquad (\text{Eq. 6})$$

where each $a_k$ is a Fourier series coefficient (e.g., resulting from Fourier transform of a profile of angular speed of the drill bit over a timer period), k is the integer corresponding to the kth Fourier series coefficient, $\omega_0$ is the main stick-slip frequency, and t is time.

In some embodiments, ESC may be achieved by adding a sinusoidal signal to the Fourier series coefficients $a_k$ in order to generate perturbations, as incorporated into Eq. 6 and shown by sinusoidal signal generator 515 in FIG. 5. Gradient information of the objective function 501 may then be calculated (e.g., by demodulation), while the control signal $\tau_{in}$ decreasing the objective function along the calculated gradient direction is generated by signal generator 510 through the coefficients $a_k$.

The control methods of various embodiments of the present disclosure may advantageously reduce or eliminate stick-slip, while maximizing drilling efficiency, by controlling the top drive torque (and therefore drill bit angular speed) in response to various inputs, including (directly or indirectly) downhole and other operating conditions. More generally, the various control methods may be useful in reducing downhole vibrations (such as those at the drilling bit) according to a similar or identical mechanism as used for reducing or eliminating stick-slip. Thus, discussion of some of the various embodiments herein regarding minimizing stick-slip (such as with respect to the operating conditions chart of FIG. 4) may equally apply to reducing vibrations in general in other embodiments, using the same principles. For instance, where vibration originates from an identical or similar source or sources as stick-slip (e.g., frictional forces exerted by the formation on the bit), vibration may be controlled in the same or similar manners as set forth herein.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method of controlling a top drive coupled to a drill bit via a drill string during a drilling process, comprising:
    generating a first control signal based at least in part upon a bit angular speed set-point, a first bit angular speed, and an optimization problem comprising an objective function at a first state, and one or more first state constraints to which the objective function at the first state is subject,
        wherein the one or more first state constraints comprise a model of dynamics between input torque to the top drive and resulting bit angular speed;
    controlling the top drive based at least in part upon the first control signal so as to rotate the drill bit at a second bit angular speed;
    updating the model based at least in part upon operating data associated with any one or more of the top drive, drill bit, and drill string so as to obtain an updated model;
    generating a second control signal based at least in part upon the bit angular speed set-point, the second bit angular speed, and the optimization problem comprising the objective function at a second state and one or more second state constraints to which the objective function at the second state is subject,
        wherein the one or more second state constraints comprise the updated model; and
    controlling the top drive based at least in part upon the second control signal so as to rotate the drill bit at a third bit angular speed.

2. The method of claim 1 wherein the objective function comprises one or more terms, wherein each term is associated with a multiplicative weighting factor, and further wherein each term describes a physical aspect of a system comprising the top drive and the drill bit.

3. The method of claim 2 wherein the objective function comprises a stick-slip reducing term associated with a first weighting factor; a torque input term associated with a second weighting factor; and a drilling energy efficiency term associated with a third weighting factor.

4. The method of claim 3 further comprising updating one or more of the first, second, and third weighting factors based at least in part upon one or more operating conditions associated with the drill bit such that the objective function at the second state comprises an updated first weighting factor, an updated second weighting factor, and an updated third weighting factor.

5. The method of claim 4 wherein the one or more of the first, second, and third weighting factors is updated such that the rate of change of the one or more of the first, second, and third weighting factors is restricted to satisfy a Lyapunov function to ensure stability.

6. The method of claim 4 wherein the operating conditions comprise weight-on-bit and bit angular speed.

7. The method of claim 6 wherein the one or more of the first, second, and third weighting factors are updated so as to modify the objective function's emphasis on any one or more of drilling efficiency and stick-slip prevention.

8. The method of claim 1 wherein generating the first control signal comprises finding the minimum solution of the objective function at the first state; and wherein generating the second control signal comprises finding the minimum solution of the objective function at the second state.

9. The method of claim 1 further comprising:
    further updating the updated model based at least in part upon the operating data associated with any one or more of the top drive, drill bit, and drill string so as to obtain a subsequently updated model,
    generating a subsequent control signal based at least in part upon the bit angular speed set-point, the second bit angular speed, and the optimization problem at a subsequent state, wherein the optimization problem at a subsequent state is subject to one or more subsequent state constraints, the one or more subsequent state constraints comprising the subsequently updated model;
    iteratively repeating further updating the updated model and generating the subsequent control signal during the drilling process so as to compute a series of control signals; and
    controlling the top drive based upon the series of control signals.

10. The method of claim 1 wherein any one or more of the first, second, and third bit angular speeds is estimated by an observer.

11. A method of controlling a top drive coupled to a drill bit via a drill string during a drilling process, comprising:
    estimating a first stick-slip frequency based at least in part upon a first profile of angular speed of the drill bit over a first time period;
    generating a first control signal based at least in part upon the estimated first stick-slip frequency and an objective function having one or more gradient directions, such that the first control signal decreases the value of the objective function along any one or more of the one or more gradient directions;

controlling the top drive based at least in part upon the first control signal so as to rotate the drill bit at a second profile of angular speed over a second time period;

estimating a second stick-slip frequency based at least in part upon the second profile of angular speed over the second time period;

generating a second control signal based at least in part upon the estimated second stick-slip frequency and the objective function, such that the second control signal decreases the value of the objective function along any one or more of the one or more gradient directions;

controlling the top drive based at least in part upon the second control signal so as to rotate the drill bit at a third profile of angular speed over a third time period.

12. The method of claim 11 wherein estimating the first stick-slip frequency comprises performing a Fourier transform of the first profile of angular speed of the drill bit over the first time period so as to obtain a first Fourier transformed signal and performing frequency domain analysis on the first Fourier transformed signal so as to determine the first stick-slip frequency, and wherein estimating the second stick-slip frequency comprises performing a Fourier transform of the second profile of angular speed of the drill bit over the second time period so as to obtain a second Fourier transformed signal and performing frequency domain analysis on the second Fourier transformed signal so as to determine the second stick-slip frequency.

13. The method of claim 12 wherein the first control signal comprises one or more Fourier coefficients.

14. The method of claim 13 wherein generation of the first control signal is further based at least in part upon a sinusoidal signal added to the Fourier coefficients.

15. The method of claim 11 wherein the objective function comprises one or more terms, each of which describes a physical aspect of a system comprising the top drive and the drill bit.

16. The method of claim 15 wherein the objective function comprises a stick-slip reducing term, a torque input term, and a drilling energy efficiency term.

17. A system comprising:
a top drive coupled to a drill bit by a drill string;
a top drive actuator coupled to the top drive; and
a controller communicatively coupled to the top drive actuator, wherein the controller comprises
at least one processing resource,
an interface unit capable of transmitting a control signal to the top drive actuator, and
a computer-readable medium comprising executable instructions that, when executed, cause the at least one processing resource to
receive a drill bit angular speed set-point signal and a drill bit angular speed signal,
generate a first control signal based at least in part upon the drill bit angular speed set-point signal, the drill bit angular speed signal, and a minimizing solution to an objective function at a first state, wherein the objective function comprises one or more terms, each of which describes one or more physical dynamics of any one or more of the top drive, drill bit, and drill string, and
cause the interface unit to transmit the first control signal to the top drive actuator;
wherein the top drive applies an amount of torque to the drill string in response to the first control signal.

18. The system of claim 17 wherein the first control signal is generated based further at least in part upon a model predictive control algorithm.

19. The system of claim 18 wherein the objective function is subject to one or more constraints, the one or more constraints comprising a model of dynamics between input torque to the top drive and resulting bit angular speed.

20. The system of claim 19 wherein the objective function comprises a stick-slip reducing term associated with a first weighting factor; a torque input term associated with a second weighting factor; and a drilling energy efficiency term associated with a third weighting factor.

21. The system of claim 20 wherein the computer-readable medium further comprises executable instructions that, when executed, cause the at least one processing resource to
update one or more of the first, second, and third weighting factors after the top drive applies the amount of torque to the drill string, so as to obtain any one or more of a first updated weighting factor, a second updated weighting factor, and a third updated weighting factor, wherein the one or more of the first, second, and third weighting factors is updated based at least in part upon one or more operating conditions associated with the drill bit,
generate a second control signal based at least in part upon the bit angular speed set-point signal, the drill bit angular speed signal, and a minimizing solution to the objective function at a second state, the objective function at the second state comprising any one or more of the first updated weighting factor, the second updated weighting factor, and the third updated weighting factor, and
cause the interface unit to transmit the second control signal to the top drive actuator.

22. The system of claim 19 wherein the computer-readable medium further comprises executable instructions that, when executed, cause the at least one processing resource to
update the model of dynamics between input torque to the top drive and resulting bit angular speed, based at least in part upon operating data associated with any one or more of the top drive, drill bit, and drill string, so as to obtain an updated model,
generate a second control signal based at least in part upon the bit angular speed set-point signal, the drill bit angular speed signal, and a minimizing solution to the objective function at a second state, the objective function at the second state being subject to one or more second state constraints, the second state constraints comprising the updated model, and
cause the interface unit to transmit the second control signal to the top drive actuator.

23. The system of claim 17 wherein the first control signal is generated based further at least in part upon an extremum seeking control algorithm.

24. The system of claim 23 wherein the computer-readable medium further comprises executable instructions that, when executed, cause the at least one processing resource to
estimate a first stick-slip frequency based at least in part upon a first profile of angular speed of the drill bit over a first time period, and
generate the first control signal based further at least in part upon the estimated first stick-slip frequency.

25. The system of claim 24 wherein the executable instructions, when executed, cause the at least one processing resource to estimate the first stick-slip frequency by
performing a Fourier transform of the first profile of angular speed of the drill bit over the first time period so as to obtain a first Fourier transformed signal, and performing frequency domain analysis on the first Fourier transformed signal so as to determine the first stick-slip frequency.

26. The system of claim 25 further comprising executable instructions that, when executed, cause the at least one processing resource to
estimate a second stick-slip frequency, wherein the second stick-slip frequency is estimated based at least in part upon a second profile of angular speed of the drill bit over a second time period, the second time period beginning after the top drive applies the amount of torque to the drill string in response to the first control signal,
generate a second control signal based at least in part upon the bit angular speed set-point signal, the second profile of angular speed of the drill bit, and the estimated second stick-slip frequency, and
cause the interface unit to transmit the second control signal to the top drive actuator.

* * * * *